United States Patent
Miyaji et al.

(10) Patent No.: US 7,142,405 B2
(45) Date of Patent: Nov. 28, 2006

(54) ELECTROSTATIC CHUCK AND PRODUCTION METHOD THEREFOR

(75) Inventors: Shinya Miyaji, Yokohama (JP); Shinji Saito, Yokohama (JP)

(73) Assignee: NHK Spring Co., Ltd., Kanagawa (JP)

(*) Notice: Subject to any disclaimer, the term of this patent is extended or adjusted under 35 U.S.C. 154(b) by 292 days.

(21) Appl. No.: 10/737,816

(22) Filed: Dec. 18, 2003

(65) Prior Publication Data
US 2004/0124595 A1    Jul. 1, 2004

(30) Foreign Application Priority Data
Dec. 19, 2002    (JP)    ............... 2002-368059

(51) Int. Cl.
*H02N 13/00*    (2006.01)

(52) U.S. Cl. ..................................... 361/234
(58) Field of Classification Search ................ 361/234
See application file for complete search history.

(56) References Cited

U.S. PATENT DOCUMENTS

| | | | |
|---|---|---|---|
| 6,120,661 A * | 9/2000 | Hirano et al. | .......... 204/298.15 |
| 6,129,994 A | 10/2000 | Harada et al. | |
| 6,177,350 B1 * | 1/2001 | Sundarrajan et al. | ....... 438/688 |
| 6,272,002 B1 * | 8/2001 | Mogi et al. | .................. 361/234 |
| 6,646,233 B1 * | 11/2003 | Kanno et al. | ............... 219/390 |
| 6,771,483 B1 * | 8/2004 | Harada et al. | .............. 361/234 |
| 2002/0135969 A1 * | 9/2002 | Weldon et al. | .............. 361/234 |

FOREIGN PATENT DOCUMENTS

| | | |
|---|---|---|
| JP | 09-069554 | 3/1997 |
| JP | 11-260534 | 9/1999 |
| JP | 2002-068831 A | 3/2002 |
| JP | 2002-083861 A | 3/2002 |
| JP | 2002-289676 A | 10/2002 |
| WO | 96/27694 | 9/1996 |

* cited by examiner

*Primary Examiner*—Ronald W. Leja
(74) *Attorney, Agent, or Firm*—Arent Fox PLLC

(57) ABSTRACT

The present invention relates to an electrostatic chuck in which unification of a dielectric layer and a heating and cooling flange is omitted, whereby production cost can be decreased, resulting in having adequate corrosion resistance especially for high temperature processes for semiconductor. The electrostatic chuck comprises a stage and a dielectric layer formed on an upper surface of the stage by thermal spraying, and the dielectric layer is made of magnesium oxide.

11 Claims, 3 Drawing Sheets before plasma corrosion test after exposed to plasma for 85 hours after exposed to plasma for 92.5 hours before plasma corrosion test after exposed to plasma for 85 hours after exposed to plasma for 92.5 hours

ELECTROSTATIC CHUCK AND PRODUCTION METHOD THEREFOR

BACKGROUND OF THE INVENTION

1. Field of the Invention

The present invention relates to an electrostatic chuck used in a liquid crystal display production apparatus, a CVD production apparatus, or a PVD production apparatus, and particularly relates to a technology to obtain excellent corrosion resistance when the electrostatic chuck is used under high temperature conditions.

2. Related Art

In a semiconductor production process, when a wafer or a substrate is held in a predetermined position to perform accurate temperature control, an electrostatic chuck is generally used. Recently, according to increasing accuracy and density of semiconductor patterns, the temperatures in semiconductor production processes have been further increased. A plasma gas used in the process also tends to be changed from a conventional $C_2F_6$ gas to a $NF_3$ gas which has a higher corrosion resistance. As described above, recent semiconductor production processes are performed under severe use environments. Therefore, superior corrosion resistance is required for material used for the electrostatic chuck.

Electrostatic chucks may be categorized into two types: a type in which the major component of a dielectric layer with an absorbent face against the wafer is composed of ceramics and a type in which the major component of the dielectric layer is composed of resin. Moreover, these ceramic types may be further categorized as a sintered electrostatic chuck in which ceramic material is sintered to form the dielectric layer, and as a thermal-sprayed electrostatic chuck in which the ceramic material is thermal-sprayed to form the dielectric layer. These electrostatic chucks are bifurcated, depending on the process used, and various electrostatic chucks have been proposed.

For instance, as a ceramic sintered type, an electrostatic chuck in which major component of a material is aluminum oxide or aluminum nitride and the material is sintered is disclosed (for example, see. Japanese Patent Application Unexamined (KOKAI) Publication No. 11-260534 (p. 3–7, FIG. 1)). As a ceramics thermal-sprayed type, an electrostatic chuck in which a ceramic material of aluminum oxide-titanium oxide is thermal-sprayed to form the dielectric layer is disclosed (for example, see Japanese Patent Publication No. 2971369 (p. 5–7)). A purpose of these disclosed technologies is mainly to improve sorbability of the electrostatic chuck. Specifically, the purpose of the technology described in Japanese Patent Application Unexamined (KOKAI) Publication No. 11-260534 is to improve stabilization of absorbability at high temperatures, and the purpose of the technology described in Japanese Patent Publication No. 2971369 is to improve response of absorbability.

Generally, in a high temperature semiconductor production process in which high level corrosion resistance is required, the ceramic sintered type of electrostatic chuck is used. However, such an electrostatic chuck is expensive because the production process is complex. Furthermore, when such an electrostatic chuck is provided with a heating and cooling system, a process joining the electrostatic chuck and a heating and cooling flange is required. In this case, when the joining is performed by mechanical connection, a temperature control in a semiconductor production process is difficult. When the joining is performed by adhesive bonding, heat resistance and corrosion resistance in a bonded layer cannot be adequately obtained. Furthermore, when the joining is performed by brazing or diffusion bonding, performance of the electrostatic chuck is comparatively high. However, a particular technology is additionally required in the production in this case.

In the ceramic thermal-sprayed type of electrostatic chuck, the joining process can be omitted to directly form the dielectric layer on the heating and cooling flange. Therefore, production cost in this type of the electrostatic chuck can be lower than that in the ceramic sintered type of the electrostatic chuck. However, when a sprayed coating has vacancies at which the sprayed coating is not dense, insulating resistance can be decreased. Therefore, in this case, an impregnant in which the major component is resin must be used to perform a sealing. The insulating resistance is increased due to performing such a sealing. However, when the sealing is performed, destabilization of absorbability by degradation of the impregnant and contamination of the wafer by degradation components occur because the corrosion resistance of the impregnant is low. Moreover, due to such an inadequate corrosion resistance, the ceramic thermal-sprayed type of electrostatic chuck cannot be used in high temperature processes of the semiconductor production process.

SUMMARY OF THE INVENTION

Therefore, objects of the present invention are to provide an electrostatic chuck, in which joining of a dielectric layer and a heating and cooling flange is omitted, thereby decreasing production cost, and in particular, corrosion resistance can be adequately obtained in a high temperature process of a semiconductor production, and a production method for the electrostatic chuck.

In order to solve the above-mentioned problems, the inventors of the present invention have carried out various research and studies on the premise of omitting joining of a dielectric layer and a heating and cooling flange, thereby decreasing production cost by using the ceramics thermal-sprayed type of the electrostatic chuck. As a result, the inventors found that when a material of the dielectric layer constituting an electrostatic chuck is accordingly selected, that is, when magnesium oxide is used in place of the aluminum oxide which is conventionally used as a material of the dielectric layer constituting the electrostatic chuck, an electrostatic chuck in which adequate corrosion resistance can be obtained in the particularly high temperature processes of semiconductor production, can be obtained. The present invention has been made based on these findings.

The present invention provides an electrostatic chuck having a stage and a dielectric layer formed on an upper surface of the stage by thermal spraying, the dielectric layer is made of magnesium oxide.

Generally, corrosion resistance of ceramic material in semiconductor production processes can be graded by reactivity between ceramic materials and plasma or plasma gas, and by stability of the reaction layer (generally, a fluoride layer). Hereinafter, the reactivity and the stability will be separately explained.

First, reactivity between ceramic material and plasma or plasma gas will be explained. Such reactivity can be judged by free energy of formation obtained by reaction between fluorosis plasma which is often used in a semiconductor production process and the aluminum oxide or the magnesium oxide. The free energy of formation can be represented as follows.

Aluminum oxide: $Al_2O_3(S) + 6F = 2AlF_3(S) + 3/2O_2 + \Delta G_1$
$\Delta G_1 = -1298190 - 16.66T \cdot \ln T - 156.33T$
Magnesium oxide: $MgO(S) + 2F = MgF_2(S) + 1/2O_2 + \Delta G_2$
$\Delta G_2 = -514350 - 12.35T \cdot \ln T - 18.16T$
T: Temperature (K)
$\Delta G_1$: Free energy of formation in aluminum fluoride
$\Delta G_2$: Free energy of formation in magnesium fluoride FIG. 1 is a graph showing the relationship between free energy of each fluoride which is generated from aluminum oxide or magnesium oxide corresponding to the above formulas, and temperature. As shown in FIG. 1, in either fluoride generation reaction, values of free energy of formation show negative values, and the fluoride is easily generated by aluminum oxide compared to by magnesium oxide. Therefore, when the corrosion resistances in both oxides are compared by considering such reactivity, magnesium oxide is judged to be a material having better corrosion resistance. Therefore, magnesium oxide is more suitable than aluminum oxide as an electrostatic chuck material.

Secondly, stability of the reaction layer ($AlF_3$, $MgF_2$ in the case of the generation reaction shown in the formulas) in reactions between the ceramic material and plasma or plasma gas will be explained. Aluminum fluoride does not have a melting point, and has a high sublimation point of 1291° C. to 1537° C., whereby corrosion is not promoted in the semiconductor production process. Furthermore, magnesium fluoride also has a high melting point of 1260° C., whereby corrosion is not promoted in the semiconductor production process. Therefore, these fluorides are judged to have adequately thermal stability in the semiconductor production process. Accordingly, it is considered that a cause affecting the stability is something other than the corrosion in semiconductor production processes.

As such a cause affecting the stability, for example, adherence between the generated fluoride and nonfluoronated material, and bonding power of fluoride per se are cited. Therefore, plasma corrosion tests (practical example 6 and comparative example 6 described hereinafter) were performed by the inventors. As a result, magnesium fluoride was more difficult to withdraw than aluminum fluoride. Therefore, stability of the reaction layer in magnesium fluoride is also better than that of aluminum fluoride. Accordingly, even when the corrosion resistances in both oxides are compared by considering such stability, magnesium oxide is judged to be a material having better corrosion resistance. Therefore, magnesium oxide is more suitable than aluminum oxide as an electrostatic chuck material.

Based on the above belief, in the electrostatic chuck of the present invention, the dielectric layer is made of magnesium oxide as stated above. Therefore, corrosion resistance of the electrostatic chuck of the present invention is better than that of the conventional electrostatic chuck using aluminum oxide as a dielectric layer, in the case of considering both the reactivity between ceramic material and plasma or plasma gas, and the stability of reaction layer (fluoride layer). Accordingly, the electrostatic chuck of the present invention is suitable especially for high temperature semiconductor processes. As mentioned above, the electrostatic chuck of the present invention is a ceramic sprayed type, whereby unification of a dielectric layer and a heating and cooling flange can be omitted, resulting in decreased production cost.

In such an electrostatic chuck, when the absorption of the wafer on the absorbent face is due to coulomb force, absorbability increases as the thickness of the dielectric layer decreases, whereby temperature control of the wafer can be accurately performed with high response. However, from the viewpoint of obtaining adequate insulation, when the electrostatic chuck further comprises an electrode, the thickness from the electrode positioned below or inside the dielectric layer of the electrostatic chuck, to the upper surface of the dielectric layer is preferably not less than 50 μm. The thickness is the thickness of the entire dielectric layer because a stage generally positioned below the dielectric layer acts as an electrode when the electrostatic chuck is composed of only the dielectric layer. When the electrostatic chuck is composed of the dielectric layer and electrode buried in the dielectric layer, the thickness is the thickness of the dielectric layer above the electrode.

Furthermore, in such an electrostatic chuck, when the film thickness of the dielectric layer is large, cracking or peeling in a sprayed film which is a dielectric layer can occur in spraying, and it takes a long time to form the dielectric layer, resulting in increased production costs. Moreover, when the film thickness of the dielectric layer is large, a characteristic of thermal shock of the electrostatic chuck is decreased. From the above-mentioned viewpoint, thickness from the electrode positioned below or inside the dielectric layer to the upper surface of dielectric layer is preferably not more than 3000 μm.

Additionally, in such an electrostatic chuck, corrosion resistance and electric resistance increase as the density of the dielectric layer which is sprayed increases. Furthermore, when the density is high, sealing is not required as the technology described in Japanese Patent Publication No. 2971369, whereby change of absorbability with time and contamination by degradation of resin component do not occur. From the above-mentioned viewpoint, in the electrostatic chuck of the present invention, the relative density in the section of the dielectric layer is preferably not less than 80%. The relative density is the ratio of an area in which the dielectric layer exists to the whole area, in any cross section of the dielectric layer.

In the spraying or semiconductor production process, thermal stress is generated by differences in coefficients of thermal expansion in the boundary face between the stage and the dielectric layer which forms on the upper surface of the stage. The thermal stress increases as the absolute value of the differences in coefficient of thermal expansion increases or as the change in temperature increases. When the thermal stress exceeds a steady value, cracking and peeling occur in the area between the stage and the dielectric layer. Generally, the coefficient of thermal expansion of a ceramic is smaller than that of a metal. Furthermore, as a material for the stage in which the dielectric layer is formed in the semiconductor production process, a material having excellent corrosion resistance must be used, and for example, aluminum or aluminum alloy is suitable for the stage. Therefore, as a material of the dielectric layer, magnesium is preferably used because the absolute value of the difference in coefficient of thermal expansion between magnesium and aluminum or aluminum alloy is comparatively small, and because the coefficient of thermal expansion of magnesium after reduction is comparative large in ceramics of $14 \times 10^{-6}$ (1/° C.). That is, the thermal stress generated in spraying or semiconductor production processes, in the case of using magnesium oxide as the dielectric layer, is smaller than that in the case of using aluminum oxide as the dielectric layer. Actually, when magnesium oxide is used as a dielectric layer and aluminum or aluminum alloy is used as a stage which is a substrate for spraying the dielectric layer, cracking or peeling hardly occurs. Especially when the absolute value of the difference in coefficient of thermal expansion between a material composing the dielectric layer and a material composing the stage is not more than $10 \times 10^{-6}(1/°C.)$, the cracking and peeling are preferably prevented with reliability.

In the electrostatic chuck as described above, when purity of magnesium oxide, which is the major component of the dielectric layer, is low, corrosion conditions on the absorbent face are nonuniform, whereby changes in absorbability over time can occur. Therefore, the purity of magnesium oxide is preferably not less than 95%.

Furthermore, generally, ceramic oxide films which are obtained by plasma spraying exhibit non-stoichiometric compositions which is a condition of oxygen defects. This condition is especially promoted when reducing gas or inert gas is used as a plasma acting gas in the spraying. Therefore, a composition which is about equal to stoichiometric composition is preferably required in order to increase the corrosion resistance and the electrical insulation. That is, when magnesium oxide is used as the major component in the dielectric layer of the electrostatic chuck of the present invention, a composition ratio of oxygen to magnesium is preferably not less than 0.8 by atomic ratio.

Moreover, the absorption (contact) and desorption (non-contact) are repeated between the electrostatic chuck and wafer in the semiconductor production process. Damage in absorption and desorption decreases as the average surface roughness Ra of the dielectric layer on the absorbent face decreases, whereby the number of grains which are withdrawn from the dielectric layer is decreased. However, when the average surface roughness Ra is less than 0.01 µm, it takes a long process time, whereby the production cost is increased and the chucked wafer cannot be relweased. When the average surface roughness Ra is more than 50 µm, sorbability against the wafer is unstable, whereby temperature control by the electrostatic chuck cannot be accurately performed. Accordingly, average surface roughness Ra of the dielectric layer on the absorbent face is preferably 0.01 to 50 µm.

Additionally, a production method for the electrostatic chuck of the present invention is a method in which the electrostatic chuck is preferably produced, and in which the electrostatic chuck has a stage and a dielectric layer formed on an upper surface of the stage by spraying, the spraying is plasma spraying and oxygen gas or gas including oxygen is used to perform the plasma spraying.

According to the production method for the electrostatic chuck of the present invention, as mentioned-above, the production cost is decreased by using a ceramic thermal-sprayed type based on these assumptions, and a electrostatic chuck in which adequate corrosion resistance is obtained, especially in high temperature processes for semiconductors, can be provided by using magnesium oxide as a material of the dielectric layer composing the electrostatic chuck. Furthermore, compositions of ceramic oxide films of the electrostatic chuck can be a composition about equal to the stoichiometric composition by using oxygen gas or gas including oxygen as the plasma acting gas, thereby obtaining excellent corrosion resistance and electric insulation in the electrostatic chuck. Aluminum or aluminum alloy can be used for the stage of spraying the dielectric layer.

BRIEF EXPLANATIO OF DRAWINGS

EXAMPLES

The following description will discuss the present invention based upon examples in detail.

A sprayed film (an electrostatic chuck) made of magnesium oxide was produced, and research concerning the characteristic of thermal shock and electrical insulation were performed. Furthermore, plasma corrosion tests by using fluorine gas were performed for magnesium oxide and aluminum oxide, whereby corrosion resistance was compared in these oxides. Hereinafter, the terms will be respectively explained in detail.

The Test Concerning Characteristics of Thermal Shock

Figure 1:
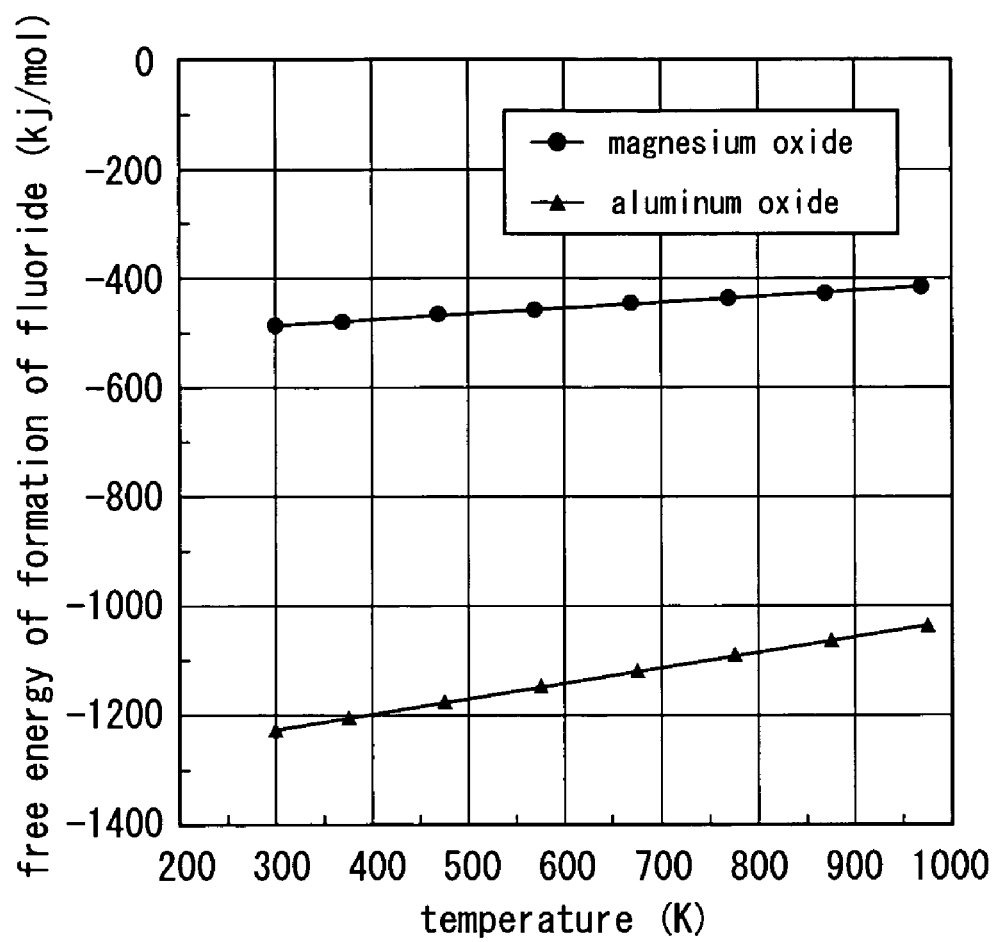
FIG. 1 is a graph showing the relationship between free energy of each fluoride which is generated from aluminum oxide or magnesium oxide and temperature.

Magnesium oxide was sprayed by using oxygen gas as the plasma acting gas on an upper surface of an aluminum stage of 30 mm×30 mm×5 mm, whereby four kinds of magnesium oxide sprayed films of 30 mm×30 mm (practical examples 1 to 3, and comparative example 1) were produced. Thicknesses of the sprayed films of practical example 1 to 3 were not more than 3000 µm, and thicknesses of the sprayed film of the comparative example 1 was more than 3000 µm. After these sprayed films were heated to 200° C., thermal shock tests were performed by plunging the films into water at 20° C., whereby separation between stage and sprayed film was measured. The results in the film thickness of the sprayed film and separation in the practical examples and the comparative example are shown in FIG. 1.

TABLE 1

| | film thickness of sprayed film (µm) | separation between stage and sprayed film |
|---|---|---|
| Practical Example 1 | 100 | none |
| Practical Example 2 | 500 | none |
| Practical Example 3 | 3000 | none |
| Comparative Example 1 | 4000 | present |

As shown in Table 1, cracking and peeling do not occur in the sprayed films (practical examples 1 to 3) having film thicknesses of not more than 3000 µm. On the other hand, peeling between the stage and the sprayed film occurs in the sprayed films (comparative example 1) having film thickness of more than 3000 µm.

Tests Concerning Electric Insulation

Magnesium oxide was sprayed by using oxygen gas as the plasma acting gas on an upper surface of an aluminum stage of 30 mm×30 mm×5 mm, whereby six kinds of magnesium oxide sprayed films of 30 mm×30 mm×5 mm (practical examples 4 and 5 and comparative examples 2 to 5) were produced. In the production, the filling rate in the section of the sprayed films (the dielectric layers) and film thickness in the practical examples and the comparative example were set to be as shown in Table 2.

TABLE 2

|  | filling rate in section of sprayed film (%) | film thickness of sprayed film (μm) | existence of dielectric breakdown by spark in sprayed film |
|---|---|---|---|
| Practical Example 4 | 90 | 50 | none |
| Practical Example 5 | 80 | 50 | none |
| Comparative Example 2 | 90 | 30 | present |
| Comparative Example 3 | 80 | 30 | present |
| Comparative Example 4 | 75 | 50 | present |
| Comparative Example 5 | 75 | 30 | present |

Carbon electrodes with diameters of 20 mm were formed on each sprayed film produced as shown in Table 2, and DC voltage was applied between the electrode and the stage. The DC voltage was set to be DC 1 kV which is about equal to an applied voltage of the electrostatic chuck. Under such conditions, occurrence of the dielectric breakdown by a spark in the sprayed film was researched. The results are also shown in Table 2.

As shown in Table 2, dielectric breakdown do not occur in the sprayed films (practical examples 4 and 5) in which the filling rate in the section of the magnesium oxide sprayed film (dielectric layer) is not less than 80% and film thickness is not less than 50 μm. On the other hand, dielectric breakdown occurs in the sprayed films (comparative examples 2 to 5) in which the filling rate is less than 80% or the film thickness is less than 50 μm.

Plasma Corrosion Test

Figure 2A:
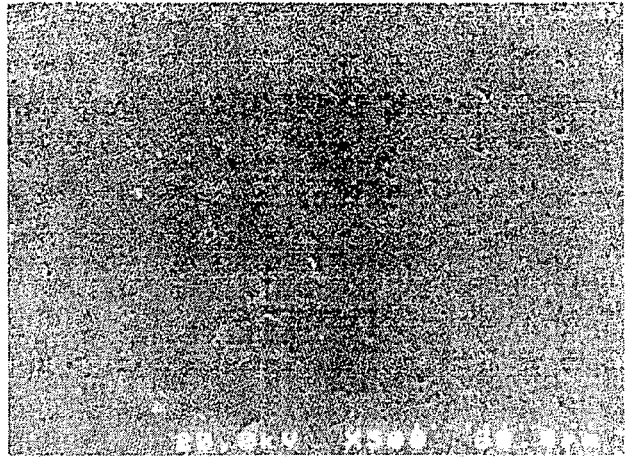
FIGS. 2A, 2B and 2C show physiognomic pictures of a sprayed film composed of magnesium oxide, A is a condition before plasma corrosion test, B is a condition after the sprayed film is exposed to $C_2F_6$ plasma for 85 hours, and (b) is a condition after the sprayed film is exposed to $C_2F_6$ plasma for 92.5 hours.
Figure 2B:
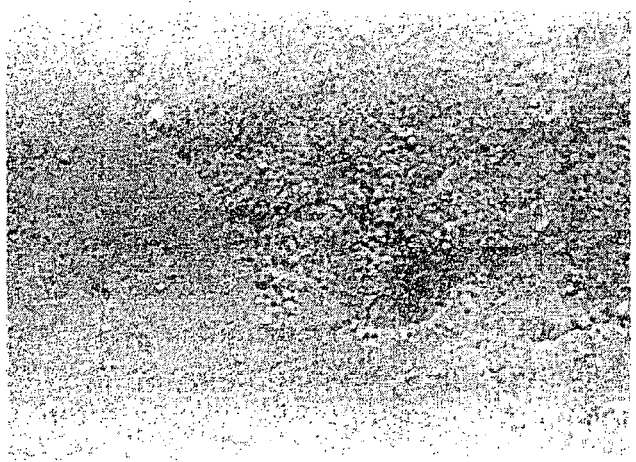
Figure 2C:
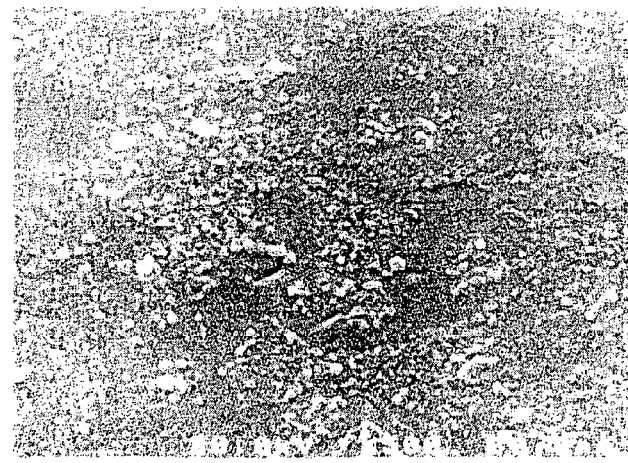
Figure 3A:
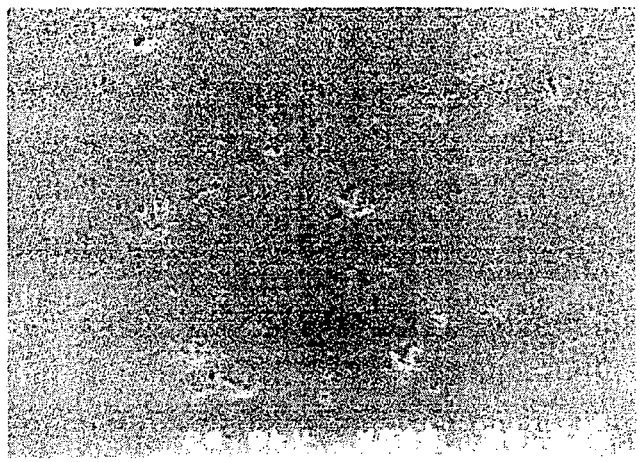
FIGS. 3A, 3B and 3C is a physiognomic picture of a sprayed film composed of aluminum oxide, A is a condition before plasma corrosion test, B is a condition after the sprayed film is exposed to $C_2F_6$ plasma for 85 hours, and C is a condition after the sprayed film is exposed to $C_2F_6$ plasma for 92.5 hours.
Figure 3B:
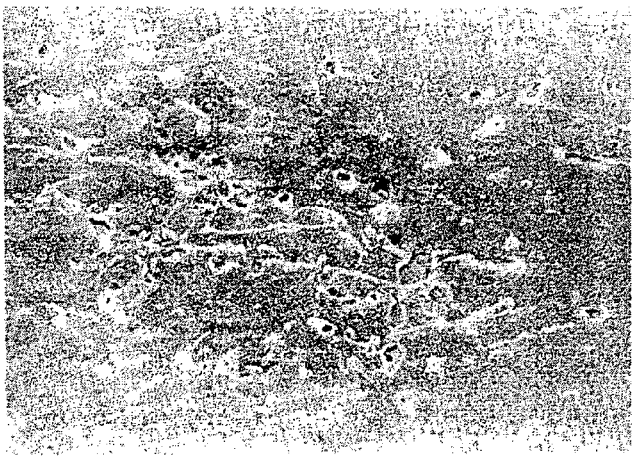
Figure 3C:
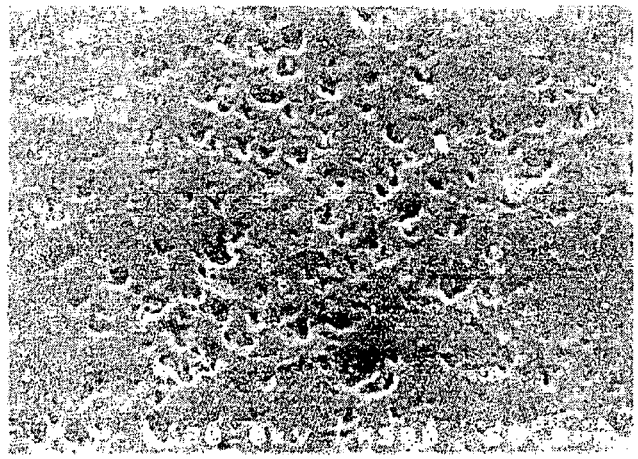

Magnesium oxide was sprayed by using oxygen gas as the plasma acting gas on an upper surface of an aluminum stage of 30 mm×30 mm×5 mm, whereby two kinds of magnesium oxide sprayed films of 30 mm×30 mm×5 mm (practical example 6 and comparative example 6) were produced. The sprayed film (practical example 6) was exposed to $C_2F_6$ plasma, whereby weight change and physiognomic change of the surface were researched. Furthermore, the same test was also performed for the sprayed film (comparative example 6) made of aluminum oxide which is produced in a manner similar to that of practical example 6. The result of the weight change is shown in Table 3, and photographs concerning physiognomic change with time of respective oxide are shown in FIGS. 2A to 2C and FIGS. 3A to 3C. In the Figures, FIGS. 2A and 3A show a condition before the sprayed film is exposed to the $C_2F_6$ plasma, FIGS. 2B and 3B show a condition after the sprayed film is exposed to the $C_2F_6$ plasma for 85 hours, and FIGS. 2C and 3C show a condition after the sprayed film is exposed to the $C_2F_6$ plasma for 92.5 hours.

TABLE 3

|  |  | weight change (mg) | |
|---|---|---|---|
|  | material | after 85 hours exposure | after 92.5 hours exposure |
| Practical Example 6 | magnesium oxide | 0.25 | −0.8 |
| Comparative Example 6 | aluminum oxide | 0.22 | −1.69 |

As shown in Table 3, when the exposure time is 85 hours, weight in the sprayed film (practical example 6) made of magnesium oxide is increased by 0.25 mg. On the other hand, weight in the sprayed film (comparative example 6) made of aluminum oxide is increased by 0.22 mg. Furthermore, as shown in FIG. 2B, fluoride is formed on nearly the entire surface of the sprayed film of the practical example 6. On the other hand, as shown in FIG. 3B, fluoride is formed on the surface of the sprayed film of the comparative example 6, and many vacancies are formed on the surface. Fluoride is not detected in the portions of these vacancies. As mentioned above, although the weight change of the sprayed film of the practical example 6 is similar to that of the comparative example 6, fluoride and release occur extensively in the sprayed film of the comparative example 6 when the surface is observed.

Then, as concurrently shown in Table 3, when the exposure time is 92.5 hours, the weight in the sprayed film (practical example 6) made of magnesium oxide is decreased at 0.8 mg, and weight in the sprayed film (comparative example 6) made of aluminum oxide is also decreased at 1.69 mg. Furthermore, as shown in FIG. 2C, the surface of the 92.5 hours exposed-sprayed film of the practical example 6 is smoother than that of the 85 hours exposed-sprayed film of the same (ref. FIG. 2B), that is, the portion of the magnesium oxide in the sprayed film in the FIG. 2C is larger than that in the FIG. 2B. This is the reason why fluoride is withdrawn from magnesium oxide. On the other hand, as shown in FIG. 3C, fluoride is not detected on the surface of the sprayed film of the comparative example 6. The shrinkage of the weight in the sprayed film of the comparative example 6 is larger than that of practical example 6, because the generated-fluoride is massively withdrawn from the aluminum oxide. As mentioned-above, the corrosion resistance of the sprayed film made of magnesium oxide can be judged to be superior to that of the sprayed film made of aluminum oxide from the results of the plasma corrosion tests.

What is claimed is:

1. An electrostatic chuck comprising:
   a stage;
   a dielectric layer formed on an upper surface of the stage by thermal spraying; and
   an electrode positioned below or inside of the dielectric layer,
   wherein the dielectric layer is made of magnesium oxide,
   wherein a thickness from the electrode to an upper surface of the dielectric layer is not less than 50 μm, and
   wherein a filling rate in a section of the dielectric layer is not less than 80%.

2. The electrostatic chuck according to claim 1, wherein the thickness from the electrode positioned below or inside of the dielectric layer to the upper surface of the dielectric layer is not more than 3000 μm.

3. The electrostatic chuck according to claim 1, wherein an absolute value of difference in coefficient of thermal expansion between a material composing the dielectric layer and a material composing the stage is not greater than $10×10^{-6}(1/°C.)$.

4. The electrostatic chuck according to claim 1, wherein the stage is made of aluminum or aluminum alloy.

5. The electrostatic chuck according to claim 1, wherein purity of the magnesium oxide is not less than 95%.

6. The electrostatic chuck according to claim 1, wherein a composition ratio of oxygen to magnesium is not less than 0.8 by atomic ratio.

7. The electrostatic chuck according to claim 1, wherein average surface roughness Ra of the dielectric layer on the absorbent face is 0.01 to 50 μm.

8. A production method for an electrostatic chuck comprising a stage, a dielectric layer formed on an upper surface of the stage by thermal spraying, and an electrode positioned below or inside of the dielectric layer the method comprising the step of:

spraying a plasma of a gas containing a oxygen, wherein a thickness from the electrode to an upper surface of the dielectric layer is not less than 50 μm, and wherein a filling rate in a section of the dielectric layer is not less than 80%.

9. The production method for an electrostatic chuck according to claim 8, wherein magnesium oxide is used as a material of the dielectric layer.

10. The production method for an electrostatic chuck according to claim 8, wherein oxygen gas or gas including oxygen is used as a plasma acting gas.

11. The production method for an electrostatic chuck according to claim 8, wherein aluminum or aluminum alloy is used for the stage.

* * * * *